No. 677,774. Patented July 2, 1901.
W. R. DAWSON.
CLEANING ATTACHMENT FOR RAKES.
(Application filed Dec. 27, 1900.)
(No Model.)
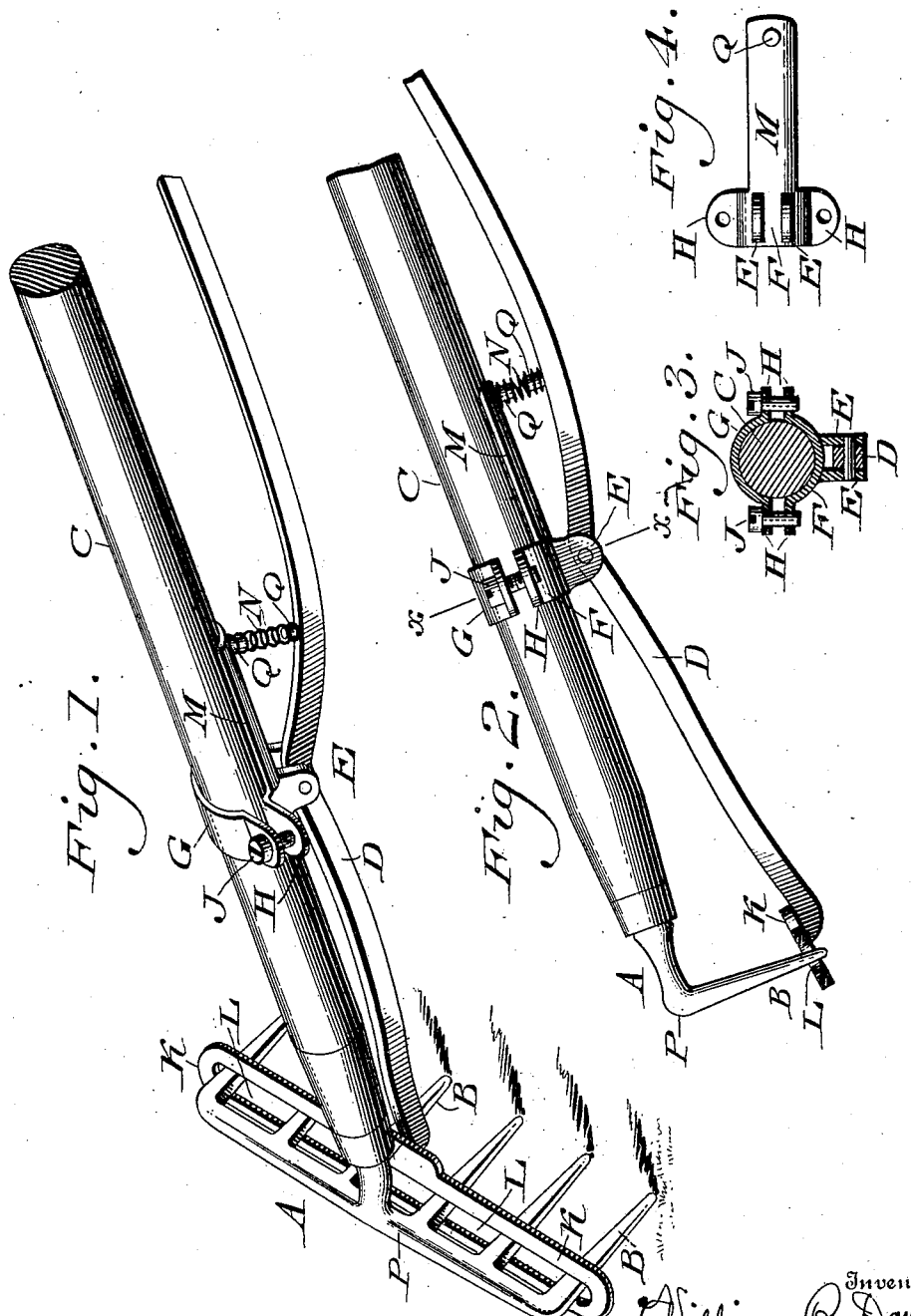

UNITED STATES PATENT OFFICE.

WILLIAM R. DAWSON, OF AUGUSTA, GEORGIA, ASSIGNOR OF ONE-HALF TO RYERSON S. GUESS, OF SAME PLACE.

CLEANING ATTACHMENT FOR RAKES.

SPECIFICATION forming part of Letters Patent No. 677,774, dated July 2, 1901.

Application filed December 27, 1900. Serial No. 41,201. (No model.)

*To all whom it may concern:*

Be it known that I, WILLIAM R. DAWSON, a citizen of the United States, residing at Augusta, in the county of Richmond, State of Georgia, have invented a new and useful Improvement in Cleaning and Clearing Attachments for Rakes, of which the following is a specification.

My invention consists in an attachment for a rake adapted to clear and clean the teeth thereof of grass, clods, dirt, and other obstructions, the same being applicable to the head of the rake and adjustably connectible with rake-handles of different thicknesses, while also being adapted to prevent cutting, piercing, or otherwise weakening of the same.

It also consists in providing the bearing of the lever with a tongue which is adapted to form a seat with the spring which presses against said lever, whereby said spring is prevented from coming in contact with the rake-handle and cutting the same and also from being lost.

Figure 1 represents a perspective view of a rake and the attachment therefor embodying my invention. Fig. 2 represents a side elevation thereof, the attachment being in a different position from that shown in Fig. 1. Fig. 3 represents a transverse section on line $x\ x$, Fig. 2. Fig. 4 represents a plan view of a detached portion of the attachment.

Similar letters of reference indicate corresponding parts in the figures.

Referring to the drawings, A designates the head of a rake, B the prongs or teeth thereof, and C the handle.

D designates a lever which extends in the longitudinal direction of the handle and is mounted on the ears E, the latter projecting from the plate F, at a right angle thereto, opposite to which latter is the plate G, which plates F and G are depressed to fit the adjacent opposite portions of the handle C and having eyes H on their ends for the reception of the screws J, whereby the plates may be clamped to the handle.

K designates a bar which is connected with the end of the lever D adjacent to the head A and provided with the slot L, in which the several teeth of the rake are freely received.

Projecting rearwardly from the plate F in the longitudinal direction of the handle is the tongue M, which is located on said handle and forms a seat for the spring N, the latter bearing against the adjacent handle portion of the lever for holding the bar K in normal or inoperative positions.

It is evident that when grass, dirt, or other matter clog the teeth and the lever D is operated the bar K is caused to traverse the teeth toward the points thereof, and thus strip and clean the same, after which the lever is let go, when the bar, owing to the spring N, resumes its normal position adjacent to the cross-bar P of the head A without interfering with the usual operation of the rake.

In order to prevent displacement of the spring N, which is preferably of the order of a coil, the lever D and tongue M are provided with teats or studs Q, on which the ends of the spring are fitted.

It will be seen that the attachment may be secured to the handle of the rake without piercing the same either for the clamping-plates F and G or the spring N, so that the handle is not weakened, and the attachment may be adjusted on the handle so that the bar K may properly fit the head of the rake. Furthermore, the slot L, which is unbroken from end to end of the bar, receives all of the teeth with which the head A may be supplied within the same as a single opening, whether the teeth are close or far apart, avoiding special register for the slot with individual teeth.

It is evident that the attachment is applicable to existing rakes without any alterations in the latter.

Having thus described my invention, what I claim as new, and desire to secure by Letters Patent, is—

1. In a cleaning and clearing attachment for a rake, a bar adapted to traverse the teeth of the rake, a lever carrying said bar, a bearing for said lever attachable to the handle of the rake, a tongue extending from said bearing in the longitudinal direction of said handle, and a spring seated on said tongue and adapted to press against said lever.

2. In a cleaning and clearing attachment for a rake, a lever provided with a bar adapted to traverse the teeth of the head of the rake, a clamping device on which said lever is mounted, a tongue on said clamp, and a returning spring, the latter being seated on said tongue and adapted to bear against said lever, said tongue extending from said clamp in the longitudinal direction of the head of the rake and adapted to rest on said handle.

3. A pair of plates adapted to clamp the handle of the rake, eyes on said plates, screws in said eyes, a lever mounted on one of said plates, a tongue extending from said plate in the longitudinal direction of the handle and adapted to rest upon said handle and a spring interposed between said lever and said tongue and bearing against said lever.

WILLIAM R. DAWSON.

Witnesses:
A. S. DAUGHTY,
J. B. WOOD.